(12) United States Patent
Chang et al.

(10) Patent No.: US 6,567,776 B1
(45) Date of Patent: May 20, 2003

(54) SPEECH RECOGNITION METHOD USING SPEAKER CLUSTER MODELS

(75) Inventors: Sen-Chia Chang, Chang-Hua Hsien (TW); Shih-Chieh Chien, Tai-Chung Hsien (TW); Chung-Mou Penwu, Chung-Ho (TW)

(73) Assignee: Industrial Technology Research Institute, Hsin-Chu Hsien (TW)

( * ) Notice: Subject to any disclaimer, the term of this patent is extended or adjusted under 35 U.S.C. 154(b) by 0 days.

(21) Appl. No.: 09/542,844

(22) Filed: Apr. 4, 2000

(30) Foreign Application Priority Data

Aug. 11, 1999 (TW) ........................... 88113706 A

(51) Int. Cl.⁷ ................. G10L 15/06; G10L 15/14
(52) U.S. Cl. ................. 704/236; 704/245; 704/250
(58) Field of Search ................. 704/236, 240, 704/243, 244, 245, 246, 250

(56) References Cited

U.S. PATENT DOCUMENTS

| | | | | |
|---|---|---|---|---|
| 5,787,394 A | * | 7/1998 | Bahl et al. | 704/231 |
| 6,006,184 A | * | 12/1999 | Yamada et al. | 704/245 |
| 6,073,096 A | * | 6/2000 | Gao et al. | 704/245 |
| 6,107,935 A | * | 8/2000 | Comerford et al. | 340/5.52 |
| 6,125,345 A | * | 9/2000 | Modi et al. | 704/232 |

OTHER PUBLICATIONS

Siohan et al., "Speaker identification using minimum classification error training, " Proceedings of the 1998 IEEE International Conference on Acoustics, Speech and Signal Processing, May 1998, vol. 1, pp. 109–112.*

Reichl et al., "A hybrid RBF–HMM system for continuous speech recognition," ICASSP–9 International Conference on Acoustics, Speech, and Signal Processing, May 1995, vol. 5,pp. 3335–3338.*

McDermott et al., "A telephone–based directory assistance system adaptively trained using minimum classification error/generalized probabilistic descent," ICASSP–9, May 1996, vol. 6, pp. 3346–3349.*

Salmela et al., "On string level MCE training in MLP/HMM speech recognition system," 1999 International Conference on Systems, Man, and Cybernetics, Oct. 1999, vol., 2, pp. 165–171.*

* cited by examiner

Primary Examiner—Marsha D. Banks-Harold
Assistant Examiner—Martin Lerner
(74) Attorney, Agent, or Firm—Winston Hsu

(57) ABSTRACT

In speaker-independent speech recognition, between-speaker variability is one of the major resources of recognition errors. A speaker cluster model is used to manage recognition problems caused by between-speaker variability. In the training phase, the score function is used as a discriminative function. The parameters of at least two cluster-dependent models are adjusted through a discriminative training method to improve performance of the speech recognition.

4 Claims, 2 Drawing Sheets

SPEECH RECOGNITION METHOD USING SPEAKER CLUSTER MODELS

BACKGROUND OF THE INVENTION

1. Field of the Invention

The present invention relates to a speaker-independent speech recognition method, and more particularly, to a speech recognition method using speaker cluster models, which can be used in products involving speech recognition such as spoken dialogue systems and auto-attendant systems.

2. Description of the Related Art

From related art, we learn that speaker cluster models have been applied to speaker-independent speech recognition and speaker adaptation. Although used in different application fields, the speaker cluster models are built in the same training phases. A training phase starts with dividing speakers into different speaker clusters. Then a cluster-dependent model is independently trained for each speaker cluster by using the speech data of the speakers belonging to the cluster. The collection of all cluster-dependent models then forms a speaker cluster model. Most approaches in building speaker cluster models are focused on means of dividing speakers into clusters, especially in finding measurement of similarities across speakers. Some speaker clustering methods reported in articles of the related art are as follows:

1. Using acoustic distances across speakers to measure similarities across speakers (T. Kosaka and S. Sagayama, "Tree-structured speaker clustering for fast speaker adaptation", Proceeding of ICASSP94, pp.245–248, 1994; Y. Gao, M. Padmanabhan and M. Picheny, "Speaker adaptation based on pre-clustering training speakers", Proceeding of EUROSPEECH97, pp.2091–2094, 1997)
2. Using vocal-tract-size related articulatory parameters to measure similarities across speakers (M. Naito, L. Deng and Y. Sagisaka, "Speaker clustering for speech recognition using the parameters characterizing vocal-tract dimensions", Proceeding of ICASSP98, pp.981–984, 1998)
3. Clustering the speakers according to three classes of speaking rate—fast, medium and slow (T. J. Hazen and J. R. Glass, "A comparison of novel techniques for instantaneous speaker adaptation", Proceeding of EUROSPEECH97, pp.2047–2050, 1997).

The difference among the three aforementioned speaker clustering methods is that their methods for measuring similarities across speakers are different. There are two different speaker cluster algorithms according to clustering structure. The first algorithm is called plain speaker cluster algorithm. This algorithm clusters all speakers directly using one of the aforementioned speaker clustering methods. The second algorithm is called tree-structured speaker cluster algorithm. Please refer to FIG. 1 which illustrates a tree-structured speaker cluster model 10. The speaker cluster model 10 has a root speaker cluster A 100 where all speakers belong. The speakers in the root speaker cluster A 100 are divided into male speaker cluster M 102 and female speaker cluster F 104 according to their gender. The male speakers in the male speaker cluster M 102 are further clustered into speaker clusters M1 112 and M2 114, respectively. The female speakers in the female speaker cluster F 104 are further clustered into speaker clusters F1 122 and F2 124, respectively.

When the speaker cluster model is applied to speaker-independent speech recognition where the testing speaker who utters a speech signal is unknown, two specific decision rules are commonly employed:

I. Build a cluster pre-selection model in addition to the speaker cluster model; when receiving the speech signal, use the cluster pre-selection model to pre-select a speaker cluster to which the testing speaker who utters the speech signal most probably belongs, and only use the cluster-dependent model of the selected speaker cluster to recognize the speech signal.

II. Find a best candidate for each speaker cluster by using each of the speaker cluster models as a recognition model to recognize the speech signal, and choose as the final recognition result a candidate with the highest score across all speaker clusters.

The present invention uses the speaker cluster model in speaker-independent speech recognition. Therefore, only related techniques are introduced.

In the training phase of the speaker cluster model, the methods of the related art emphasize on how to cluster speakers. Their purpose is to cluster speakers with similar characteristics into the same speaker cluster. However, the purpose of speech recognition is to correctly recognize a speech signal. Therefore, the two purposes are not exactly the same. In other words, improving the effectiveness of speaker clustering does not necessarily improve the accuracy of speech recognition. In a recognition phase, regardless which related art recognition algorithm is used, each cluster-dependent model is seen as an independent recognition model. The dependency among different cluster-dependent models is never considered.

Clustering speakers with similar characteristics absolutely into the same speaker cluster is a difficult task. Please refer to FIG. 2. FIG. 2 shows two speaker clusters 202, 204. The speaker clusters 202, 204 have an overlapping area 206. That means that, although the speakers in each speaker cluster 202, 204 have substantially similar characteristics, some of the speakers in one speaker cluster have characteristics similar to those of the speakers in the other speaker cluster. For example, suppose there are four speakers W, X, Y and Z. Speaker W and speaker X have similar characteristics; speaker X and speaker Y have similar characteristics; and speaker Y and speaker Z have similar characteristics. When clustering, assuming that the speakers W and X are clustered into the speaker cluster 202, the speakers Y and Z are clustered into the speaker cluster 204, because the speakers X and Y have similar characteristics, they form the overlapping area 206. In a speech recognition phase, when a testing speaker who inputs a speech signal has characteristics between that of the speaker X and that of the speaker Y, if each cluster-dependent model is treated as an independent recognition model, without considering the influence that its dependency with other cluster dependent models has on recognition, the overlapping phenomena generated by clustering may have a negative effect on recognition.

SUMMARY OF THE INVENTION

It is therefore an objective of the present invention to provide a speech recognition method for improving the performance of speech recognition.

To achieve the aforementioned goal, the present invention introduces the dependency among a plurality of cluster-dependent models to overcome recognition problems caused by between-speaker variability for improving the performance of speech recognition. The speech recognition method introduced in the present invention comprises the following steps: receiving a speech signal; recognizing the speech signal using a speaker cluster model obtained in a training phase wherein the speaker cluster model is a collection of a plurality of cluster-dependent models, and a score of each candidate is calculated according to a score function which is defined by taking the dependency among the cluster-dependent models into account; and obtaining a final recognition result according to a decision rule based on the score of each candidate.

The training phase comprises building an initialization model; adjusting parameters of at least two cluster-dependent models of the initialization model by using a discriminative training method to obtain the speaker cluster model wherein the discriminative training method is implemented by using a minimum classification error as a training criterion, a discriminant function of the discriminative training method is defined in the same manner as the score function.

Drawings are incorporated with the implementation hereinafter to further describe the present invention in detail.

DETAILED DESCRIPTION OF THE PREFERRED EMBODIMENT

Figure 1:
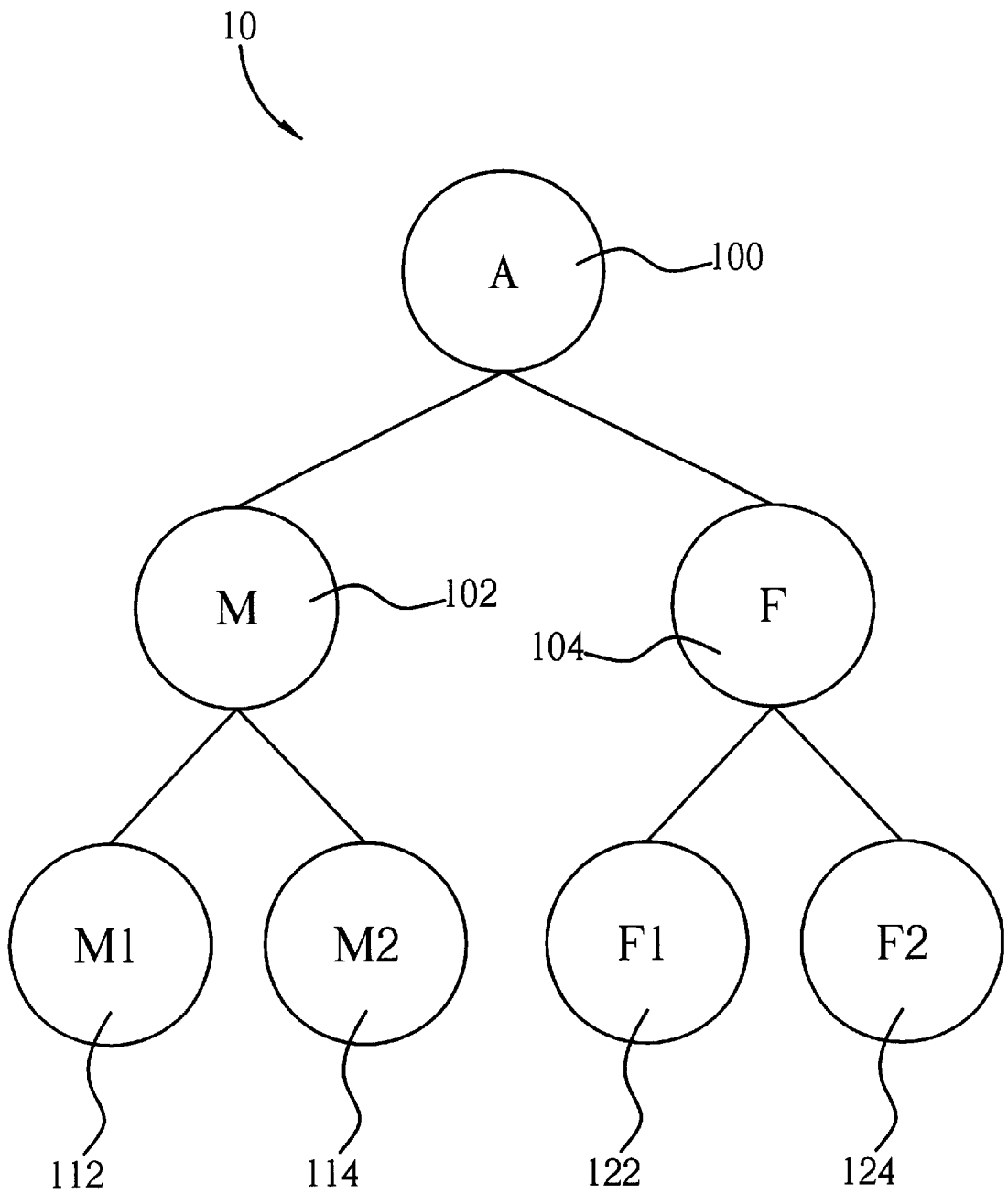
FIG. 1 is a tree-structured speaker cluster model.
Figure 2:
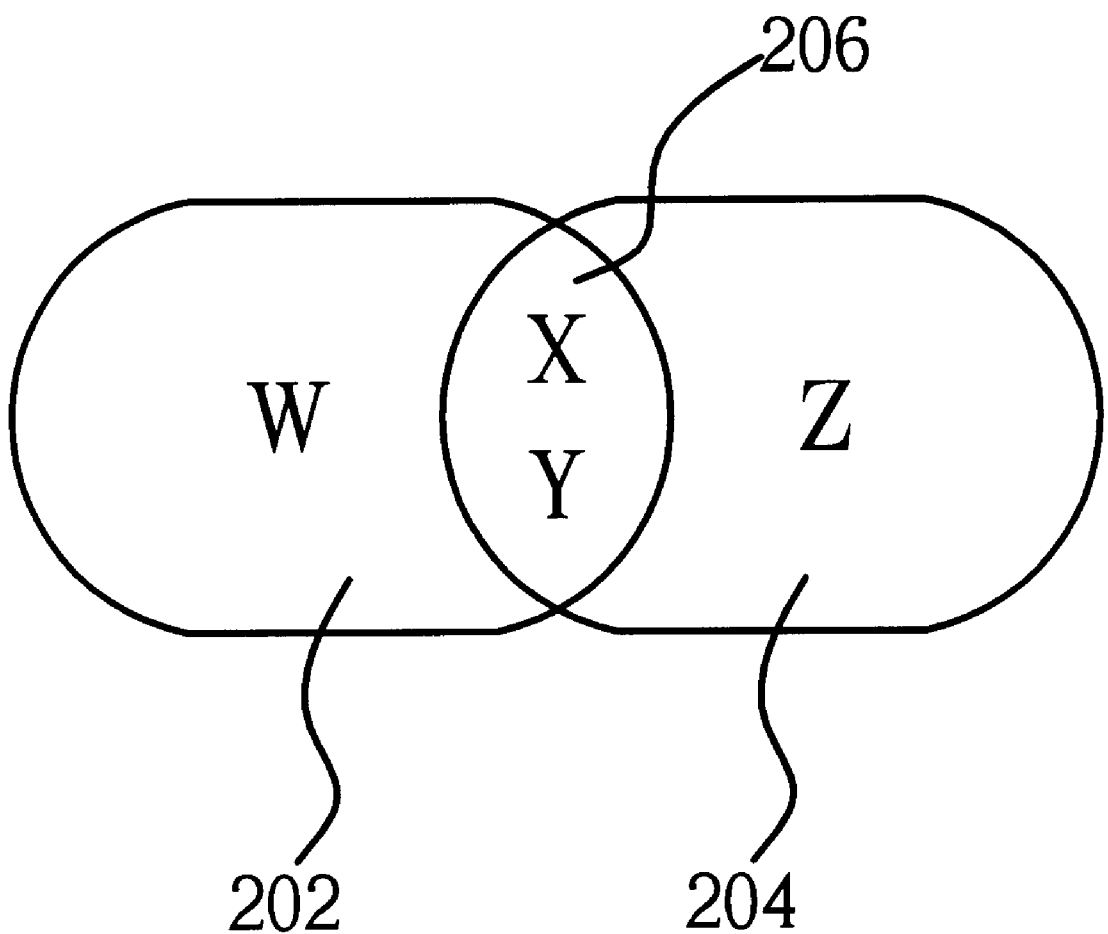
FIG. 2 shows two speaker clusters with an overlapping area.

In order to understand the detailed content of the present invention, issues of the present invention are described in detail in two parts: a speech recognition phase and a training phase.

In the speech recognition phase, for a speech signal a score of each candidate is calculated according to a score function. The score function is defined by taking the dependency among different cluster-dependent models into account. A decision rule is then used to determine the final recognition result. For example, the decision rule may be based on selecting a candidate with a highest score as the final recognition result. Assuming a speaker cluster model is composed of N cluster-dependent models and the parameter set for each cluster-dependent model is denoted as $\Lambda_n$, where $n=1,2,\ldots,N$. The parameter set $\Gamma$ of the speaker cluster model is then denoted as $\Gamma=\{\Lambda_1,\Lambda_2,\ldots,\Lambda_N\}$. In the related art, the score function $h_i$ is defined only on the parameter set $\Lambda_n$. In the present invention the score function $g_i$ is defined on the parameter set $\Gamma$ of the speaker cluster model to take the dependency among the plurality of cluster-dependent models into account. It is implemented by using a function to introduce the dependency among a plurality of cluster-dependent models. As shown in one of the examples:

$$g_i(X;\Gamma) = \log\left[\frac{1}{N}\sum_{n=1}^{N} w_n(X)\exp[h_i(X;\Lambda_n)\xi]\right]^{\frac{1}{\xi}}, i=1,2,\cdots,M \quad (1)$$

wherein X is a feature vector of the speech signal, M is the number of candidates to be classified which can be Chinese words, English alphabets or numbers, $h_i(X;\Lambda_n)$ is a log-likelihood function defined only on a parameter set $\Lambda_n$, $\xi$ is a positive weighting number, and $w_n(X)$ is a cluster weighting function that indicates the degree to which X belongs to the nth speaker cluster. In the present invention, a mean value method is used to introduce the dependency among the cluster-dependent models. In other words, in the recognition phase we will receive a speech signal. The speech signal will be recognized using a speaker cluster model obtained in the training phase. We will use the score function $g_i$, which holds the dependency among the cluster-dependent models, to calculate the score of each candidate. Then we will obtain a final recognition result according to a decision rule based on the score of each candidate.

In the training phase we initially use a related art method to train an initialization model. The related art method mentioned herein can be any of the previously discussed methods. It can have either a tree structure or a plain structure. Parameters of at least two cluster-dependent models of the initialization model are then adjusted using a discriminative training method. The discriminative training method employed is a generalized probabilistic descent method (GPD) (W. Chou, B. H. Juang and C. H. Lee, "Segmental GPD training of HMM based speech recognizer", Proc. ICASSP92, PP.473–476, 1992). In the procedure of adjusting parameters of the speaker cluster model by using the discriminative training method, two points have to be emphasized that are unique from the related art methods:

1. The discriminative training method employed is implemented using a minimum classification error as a training criterion. This makes the purpose of the training phase be consistent with the purpose of the recognition phase. This is unlike the related art method which only emphasizes clustering speakers with similar characteristics into the same cluster and thereby causes inconsistent purposes between the training phase and the recognition phase.

2. A discriminant function is defined in the same manner as the score function $g_i$ in Eq.(1). The discriminant function is defined on the parameter set $\Gamma$ of the speaker cluster model, not on the parameter set $\Lambda_n$ of only one cluster-dependent model. Thus, the parameters of at least two cluster-dependent models are no longer adjusted based on the speech data uttered by the speakers of only one speaker cluster. They are adjusted based on the speech data spoken by the speakers of at least two speaker clusters. This will cause at least two speaker clusters to become dependent. When incorporated with the training method that uses the minimum classification error as a training criterion mentioned in the first point, the dependency will have a positive impact on improving the recognition outcome.

In the following text, an embodiment is used to describe how the present invention is implemented; experiments on a speaker-independent Mandarin polysyllabic word recognition task are performed to illustrate the effectiveness of the present invention. In experiments, the number of words to be recognized is 1062. The speech data used in the experiments are uttered by 700 speakers wherein 362 speakers are male and 338 speakers are female. Each speaker utters 30 words once. The speech data spoken by 560 speakers (292 male speakers and 268 female speakers) are used as training data. The speech data spoken by the remaining 140 speakers (70 male speakers and 70 female speakers) are used as speech signals for testing. The speech database is a subset of MATDB-4 of MAT Database version 1.0 (H. C. Wang, "MAT—A project to collect Mandarin speech data through telephone networks in Taiwan", Computational Linguistics and Chinese Language processing, vol.2, no.1, pp.73–90, 1997).

We use a tree-structured speaker cluster model. Its structure is as shown in FIG. 1, having three levels and seven speaker clusters. At first, a method of the related art is used to train the initialization model. In the first level (root) of the tree we use all of the speech data to train a speaker-independent model. All speakers are then clustered according to gender. They are clustered into the male speaker cluster 102 and female speaker cluster 104 to train a gender-dependent model. This is the second level of the tree. Finally, the speakers within each gender group are clustered into two speaker clusters. For example, the male speaker cluster 102 is clustered into the speaker clusters M1 112 and M2 114, respectively. The female speaker cluster 104 is clustered into the speaker clusters F1 122 and F2 124, respectively. Hence, the third level of the tree has four clusters. In this step, we use acoustic distances across speakers to measure similarities across speakers. The method can be referenced in Y. Gao, M. Padmanabhan and M. Picheny, "Speaker adaptation based on pre-clustering training speakers", Proceedings of EUROSPEECH97, pp.2091–2094, 1997. Each cluster-dependent model of the seven clusters is composed of 100 3-state right-context-dependent INITIAL HMMs (Hidden Markov Models) and 38 5-state context-independent FINAL HMMs. Each state is represented using a mixture Gaussian probability density function. It is worth noting that the initialization model is established using a maximum likelihood as training criteria.

Later, the initialization model is used as a starting point for performing each of the following experiments. All the experimental results are listed in Table 1.

TABLE 1

Recognition Error Rates

| Experiment code | Recognition model | $\xi = 1$ | $\xi = 2$ | $\xi \to \infty$ |
|---|---|---|---|---|
| A | Speaker independent - maximum likelihood | 10.2 | 10.2 | 10.2 |
| B | Speaker independent - discriminative training | 8.8 | 8.8 | 8.8 |
| C | Gender dependent | 7.8 | 7.6 | 7.7 |
| D | Speaker independent + gender dependent | 7.4 | 7.3 | 7.5 |
| E | Tree structure - related art | 7.3 | 7.2 | 7.6 |
| F | Tree structure - the present invention | 7.1 | 6.7 | 7.4 |

In the recognition phase, all $w_n(X)$ values are set to be 1, and we will try three different $\xi$ values ($\xi=1$, $\xi=2$ and $\xi \to \infty$). FIG. 1 is incorporated for explanations. The case of $\xi \to \infty$ corresponds to the decision rule II of the related art, and the experimental result is used for comparing with the experimental results of the present invention. It is worth noting that a positive finite number $\xi$ refers to the method of the present invention:

A. Use the speaker-independent model, which is built using maximum likelihood as the training criteria and is the first level (cluster 100) of the speaker cluster model, to recognize the speech signal. Its result is used for comparing with the results of other experiments. Because this level only comprises one speaker cluster, the result is the same regardless the value of $\xi$.

B. Further adjust the parameters of the model used in experiment A (cluster 100) using the discriminative training method. It is shown in Table 1 that a better recognition result is achieved using the discriminative training method. Because the training method of the speaker cluster model introduced by the present invention uses the discriminative training method, the recognition model used for comparison is also established by using the discriminative training method. However, the discriminant function $g_i$ of the present invention is different from the discriminant function $h_i$ of the related art.

C. Perform discriminative training on the gender dependent model (male speaker cluster 102 and female speaker cluster 104 ) in. the second level of the tree. Because speakers of different gender clusters have very different characteristics, we will not adjust parameters across different gender clusters. That means that the discriminative training performed on the parameters of the male speaker cluster 102 only uses speech data uttered by male speakers. The discriminative training performed on the parameters of the female speaker cluster 104 only uses speech data uttered by female speakers. It is shown in Table 1 that the recognition result using the gender-dependent model is superior to that using the speaker-independent model. Because the gender-dependent model is a simple plain-structured speaker cluster model, the speaker cluster model can readily manage recognition problems caused by differences between speaker characteristics, improving the recognition result of speaker-independent speech recognition. Further, we find that the recognition rates are fairly close under different $\xi$ values. This result agrees with the fact that the differences between the characteristics of different gender speakers are very obvious. It also emphasizes that the male and female clusters have little dependency.

D. Form a recognition model with the speaker-independent model (cluster 100) in experiment B and the gender-dependent model (clusters 102, 104) in experiment C. That means the first two levels of the tree. This can achieve better results than using only the gender-dependent model. This emphasizes the advantage of using the tree structure.

E. Perform discriminative training on each cluster-dependent model (M1 112, M2 114, F1 122, F2 124) in the third level of the tree by using the speech data of the training speakers belonging to the corresponding cluster, and combining them with the model used in experiment D (cluster 100, male speaker cluster 102, female speaker cluster 104) to form the tree structure shown in FIG. 1. Comparing with the results of experiments C, D and E, $\xi=2$ yields the best result. This can be seen more clearly when the dependency between the cluster-dependent models becomes stronger. This shows that the score function we use is more suitable in using the speaker cluster model for recognition.

F. In this experiment we use the training method introduced in the present invention to train the speaker cluster model. In the training phase, the discriminant function is defined in the same manner as the score function in Eq.(1). Like experiment C, we don't adjust parameters across gender clusters. For example, when the speech data used for training is uttered by male speakers, the discriminative training is performed on the male speaker clusters 102, M1 112 and M2 114. The parameters of the three cluster-dependent models are adjusted at the same time. At this time, the number of clusters is N=3. The female speaker clusters 104, F1 122, and F2 124 are also trained in the same way. Thus, building the second and third levels of the tree. The first level is the model used in experiment B (cluster 100). As shown in Table 1, the speech recognition method using speaker cluster model introduced in the present invention can achieve a better speech recognition result than the related art.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A speech recognition method comprising:

receiving a speech signal;

recognizing the speech signal using a speaker cluster model obtained in a training phase wherein the speaker cluster model is a collection of a plurality of cluster-dependent models, and a score of each candidate is calculated according to a score function which is defined by taking the dependency among the cluster-dependent models into account; and obtaining a final recognition result according to a decision rule based on the Score of each candidate, wherein the training phase comprises building an initialization model, and adjusting parameters of at least two cluster-dependent models of the initialization model by using a discriminative training method to obtain the speaker cluster model wherein the discriminative training method is implemented by using a minimum classification error as a training criterion, a discriminant function of the discriminative training method being defined in the same manner as the score function, and the score function is defined as:

$$g_i(X; \Gamma) = \log\left[\frac{1}{N}\sum_{n=1}^{N} w_n(X)\exp[h_i(X; \Lambda_n)\xi]\right]^{\frac{1}{\xi}}, i = 1, 2, \cdots, M$$

wherein $g_i(X;\tilde{A})$ is the score function, X is a feature vector sequence of the speech signal, $\tilde{A}$ represents an entire parameter set of the speaker cluster model, N is the number of cluster-dependent models, parameter sets corresponding to the N cluster-dependent models are $\ddot{E}_1, \ddot{E}_2, \ldots, \ddot{E}_N$, M is the number of candidates to be classified, $h_i(X;\ddot{E}_n)$ is a log-likelihood function defined only on a parameter set $\ddot{E}_n$, $\hat{i}$ is a positive weighting number, and $w_n(X)$ is a cluster weighting function that indicates the degree to which the nth cluster-dependent model is used for recognition.

2. The speech recognition method of claim 1 wherein the discriminative training method is implemented by a generalized probabilistic descent method.

3. The speech recognition method of claim 1 wherein the decision rule is to selected a candidate with a highest score.

4. The speech recognition method of claim 1 wherein the cluster weighting function $w_n(X)$ is a zero-one function used to indicate whether the nth cluster-dependent model will be used for recognition.

* * * * *